United States Patent
Heinz (10) Patent No.: US 11,623,617 B2
(45) Date of Patent: Apr. 11, 2023

(54) AUTOMATIC GENERATION OF EMERGENCY OPERATION PROGRAMS FOR A VEHICLE WASHING INSTALLATION IN THE CASE OF A FAULT

(71) Applicant: Washtec Holding GmbH, Augsburg (DE)

(72) Inventor: Bernhard Heinz, Gersthofen (DE)

(73) Assignee: Washtec Holding GmbH, Augsburg (DE)

( * ) Notice: Subject to any disclaimer, the term of this patent is extended or adjusted under 35 U.S.C. 154(b) by 73 days.

(21) Appl. No.: 16/885,180

(22) Filed: May 27, 2020

(65) Prior Publication Data

US 2020/0282961 A1    Sep. 10, 2020

Related U.S. Application Data

(63) Continuation of application No. PCT/EP2018/082505, filed on Nov. 26, 2018.

(30) Foreign Application Priority Data

Nov. 27, 2017    (DE) ................... 10 2017 127 978.4

(51) Int. Cl.
G05B 15/02    (2006.01)
B60S 3/04    (2006.01)

(52) U.S. Cl.
CPC ............... *B60S 3/04* (2013.01); *G05B 15/02* (2013.01); *G05B 2219/2637* (2013.01)

(58) Field of Classification Search
CPC .... B60S 3/04; G05B 15/02; G05B 2219/2637
See application file for complete search history.

(56) References Cited

U.S. PATENT DOCUMENTS

| | | | |
|---|---|---|---|
| 4,293,914 A | | 10/1981 | Van Trang |
| 5,168,441 A | * | 12/1992 | Onarheim .......... G05B 19/0426 700/87 |

(Continued)

FOREIGN PATENT DOCUMENTS

| | | |
|---|---|---|
| CN | 106541931 A | 3/2017 |
| CN | 107264484 A | 10/2017 |

(Continued)

OTHER PUBLICATIONS

Office Action issued in Chinese Counterpart Patent Application No. 201880076194X dated Nov. 4, 2020 and English language machine translation thereof.

(Continued)

*Primary Examiner* — Michael W Choi
(74) *Attorney, Agent, or Firm* — Ewers IP Law PLLC; Falk Ewers (57) ABSTRACT

An automatic control of a vehicle washing installation in an emergency operation in the case of a fault is provided. The following method steps are carried out: detecting an error message for ascertaining a fault state of the vehicle washing installation. In response to the detected fault state: specifying function blocks, which can be activated in a fault-free manner, on the basis of a read-in equipment data set which represents the current equipping of the vehicle washing installation with machine components for computing emergency operation programs; controlling a vehicle washing installation for carrying out the emergency operation on the basis of the calculated emergency operation programs.

14 Claims, 3 Drawing Sheets

(56) References Cited

U.S. PATENT DOCUMENTS

| | | | | |
|---|---|---|---|---|
| 2009/0204245 | A1* | 8/2009 | Sustaeta | H04L 67/125 |
| | | | | 700/99 |
| 2016/0059831 | A1 | 3/2016 | Belanger et al. | |
| 2016/0264104 | A1* | 9/2016 | Belanger | B60S 3/002 |
| 2017/0334071 | A1* | 11/2017 | Zhang | B25J 9/1689 |

FOREIGN PATENT DOCUMENTS

| | | |
|---|---|---|
| DE | 202007000532 U1 | 6/2008 |
| WO | 02099579 A2 | 12/2002 |
| WO | 2018024336 A1 | 2/2018 |

OTHER PUBLICATIONS

Office Action issued in German Patent Application No. DE 10 2017 127 978.4, dated Nov. 21, 2018 (from which this application claims priority) and English language translation thereof.

International Search Report dated Feb. 4, 2019 of international application PCT/EP2018/082505 on which this application is based and English language translation thereof.

Office Action issued in Chinese Counterpart Patent Application No. 201880076194X dated Feb. 5, 2021 and English language machine translation thereof.

\* cited by examiner

AUTOMATIC GENERATION OF EMERGENCY OPERATION PROGRAMS FOR A VEHICLE WASHING INSTALLATION IN THE CASE OF A FAULT

CROSS REFERENCE TO RELATED APPLICATIONS

This application is a continuation application of international patent application PCT/EP2018/082505, filed Nov. 26, 2018, designating the United States and claiming priority to German application 10 2017 127 978.4, filed Nov. 27, 2017, and the entire content of both applications is incorporated herein by reference.

TECHNICAL FIELD

The present disclosure relates to the field of automatic washing installations for vehicles and concerns in particular the activation of an emergency operation in the case of a fault for emergency operation of the washing installation.

BACKGROUND

The washing installations include a large number of machine components such as pumps, valves, drives, etc., which can be installed in different configurations in the washing installation. Furthermore, each operator has specific requirements and demands (e.g., local water supply pressure, typical level of dirt on the vehicles, etc.). The machine components can be designed in part having an electronic interface and in part having sensors in order to detect a fault-free operating mode of the respective component or a failure of a component (pump, boiler, valves, etc.).

Therefore, in the related art it is known to provide fault sensors on specific components of the washing installation in order to be able to provide a fault code of the failed component in the case of a fault. For instance, e.g., a sensor number 23, which is allocated to the boiler, can signal that the boiler has failed or another sensor which is allocated to the valve can signal that the valve is no longer functioning in a fault-free manner. It is also known to determine a fault state by detecting—possibly aggregated—signals from sensors which provide operating signals used for operating and/or for controlling the installation.

In the prior art, it has proved to be disadvantageous that even in the case of fault states which would permit a restricted function of the installation (because only a partial function has failed), a service technician has to be called and under certain circumstances the complete installation can no longer be operated and is at a standstill. This results in downtimes which can easily be avoided if, e.g., the component is not essential for the operation of the installation or if the installation could continue to be operated with selected and specific washing programs which do not require the use of the failed component.

The washing installations are located great distances apart from one another particularly in Scandinavian countries and so the installation is frequently at a standstill for a very long time until the fault is dealt with by a requested service technician.

In order to avoid these disadvantages, it is desirable to be able to analyse the fault state of the installation on site and locally at the installation in order to be able to continue to operate the installation in an emergency operation.

SUMMARY

In view of the foregoing, it is an object of the present disclosure to improve the operation of automatic vehicle washing installations and in particular to provide a local analysis procedure in the case of a fault in order to permit an emergency operation. Furthermore, the operating costs of the installation and the maintenance outlay are to be lowered.

This object is achieved by a method for controlling an emergency operation of a vehicle washing installation in the case of a fault, a fault control module for controlling an emergency operation of a vehicle washing installation in the case of a fault, a vehicle washing installation, and a computer program as described herein.

According to a first aspect, the disclosure relates to a method for controlling an emergency operation of a vehicle washing installation if, for instance, a fault has been detected on the vehicle washing installation or on one of its components (i.e., in the case of a fault) which makes normal, further operation of the vehicle washing installation impossible.

According to the first aspect, the method includes the following steps:

detecting an error message of a machine component, ascertaining a fault state for the entire vehicle washing installation (hereinafter also abbreviated to washing installation or machine) on the basis of the detected error message, in response to the detected fault state: specifying function blocks, which can be activated in a fault-free manner, from a provisioned group of function blocks with their sequence variations on the basis of a read-in equipment data set which represents the current equipping (assembly) of the washing installation with machine components (and thus a machine configuration) for proactively and automatically computing emergency operation programs or fault operation options; selectively or optionally, the computed emergency programs for emergency operation of the washing installation can be output on a user interface for confirmation by the user before said programs are executed, and automatically or semi-automatically controlling a washing installation for carrying out the emergency operation on the basis of the computed emergency operation programs (or fault operation options).

The disclosure relates to a fault procedure if a failure of an operating assembly or a machine component of the washing installation is established, said failure hitherto preventing the further intended operation of the installation such that in the prior art the installation would hitherto be at a standstill (in the case of a failure of an operating assembly, e.g., the roof brush required for the respective function, such as "roof wash"). The method in accordance with this disclosure is provided to ensure that the installation can continue to operate with the most extensive functionality possible. Said method is aimed at automatically switching the installation to an emergency operation and in so doing providing a group of emergency washing programs with function blocks and their sequence variations which, in spite of the detected fault, can still be executed in a fault-free manner, and thus computing fault operation options. According to an aspect of the disclosure, the existing washing program can be switched to an emergency washing program or can be adapted such that it is possible to execute the washing program in a fault-free manner (e.g., with other function blocks or other sequence variations of the specified function blocks). The quality can be reduced and/or the required expenditure of time for execution can be increased.

A definition of the terms used in this application is given hereinunder.

The equipment data set is a digital data set which represents provision of machine components of the washing installation. The equipment data set can designate, e.g., the installation of operating assemblies, of software and/or hardware or the currently existing fitting out of the machine from a plurality of fitting variations. Thus, depending on the machine, different operating assemblies, such as pumps, valves, drive assemblies, etc. can be installed. The existing fitting out or the machine components used are represented in the equipment data set. The equipment data set therefore includes in particular a data set element which represent the "usage" situation and thus the configuration of machine components or operating assemblies in the washing installation. This also includes the information as to the position in the washing installation at which each component is used and the version and configuration thereof. The equipment data set can typically include a changeable or dynamic operating combination data set and an unchangeable and fixed portion, namely the configuration data set. The fixed portion (configuration data set) relates to the (delivered) provision and configuration of machine components of the washing installation. It usually remains fixed after delivery of the installation. The variable changeable portion (operating combination data set) relates to changes of operating conditions, e.g., changed water pressure. It can also relate to changes on the machine components (e.g., in the case of a fault or when a machine component fails). The variable portion of the equipment data set is typically continuously read-in or detected in updated form. This typically takes place in a time phase after delivery of the installation and during operation.

The equipment data set is usually delivered directly with the installation and stored in, and available from, a local memory or a memory card on the installation. Alternatively, it can also be retrieved via an interface (e.g., an http-based interface).

The equipment data set can also include a configuration or a parametrization of the machine components, e.g., a length and/or diameter of a hose, the maximum pump output of a metering pump, the size of storage vessels and/or maximum or minimum travel speeds of drives, etc. Therefore, the generation of the emergency washing program in the case of a fault can be carried out in a more specific and dedicated manner for the respective configuration of the machine components.

In a further exemplary embodiment of the disclosure, the equipment data set includes a position element. This designates a position of the machine component in the washing installation. Therefore, a plurality of washing installation machine components of the same type can also be addressed in a dedicated manner. Thus, for example, a plurality of similar brushes can be arranged at different positions of the washing installation. In this exemplary embodiment of the disclosure, the emergency washing program to be generated can advantageously be geared to the respective positioning of the brush and control the activation thereof in terms of time.

A single machine component or a group of machine components are configured to execute a specified function block of the washing program or emergency washing program. The emergency washing program can include a sequence of steps. Different function blocks which can be operated in a fault-free manner may be required for this purpose. Therefore, according to predefined rules a first function block can be connected to a second and a third function block in a specific sequence to create an emergency washing program, in particular an emergency operating program. Thus, e.g., a group of machine components, such as a water pump, a metering pump, water valves, brush rotation drives and possibly further lifting and travel drives may be necessary to execute the function block (or module) "brush wash". In order to execute a step of the washing program a single machine component or a group of machine components is therefore necessary. If one of these machine components has failed or produces a fault, it can no longer be used for the washing program. In a further exemplary embodiment of the disclosure, the washing program includes a sequence of steps which are executed on the same and/or different machine components. The machine components are, e.g., operating assemblies of the washing installation or structural units thereof. The machine components are typically electronically controllable or even regulatable (closed loop controllable) and for this purpose have electronic interfaces for data exchange.

The function blocks are superordinate functions which the washing installation is to execute. A function block is a modular component of the washing program. The function block is therefore a module or a step in the washing program. Thus, e.g., a function block "wheel rim cleaning", "brush wash", "pre-cleaning" and/or "intensive drying" can be provided. New function blocks can be defined at any time. In accordance with an aspect of the disclosure, on the basis of currently detected variables, it is specified which function blocks are to be connected to form a washing program adapted to the local and current circumstances. The function blocks describe the functions to be carried out or actions of the washing installation not on a component level (i.e., not on the basis of the machine component level, e.g., "valve 1 open", "close switch 2", "metering pump on") but on a superordinate functional level and characterize the functions from the point of view of the operator or user. A function block therefore relates to a washing program section, e.g., "wheel wash". A function block can be operated in different sequence variations. In so doing, the sequence variations may require different machine components or operating assemblies. In the wheel wash example, e.g., in a first sequence variation, the wheel washing brush is moved from/to the wheel, which requires operation of an advancing motor. In a second sequence variation, the wheel wash can be carried out only at high pressure. In this case, the high-pressure nozzle is activated, and a movement of the wheel washing brush or motor operation is not required. If, in the detected fault state, e.g., the advancing motor has been identified as defective, the "wheel wash" function block can nevertheless be offered in the second sequence variation and executed in a fault-free manner.

Therefore, a function block has specific requirements at the component level. Thus, e.g., a brush wash requires the "brush" machine component. Which technical requirements, in particular at the component level, are connected to a specified function block are stored and fixedly encoded in the respective function block. A function block therefore includes information relating to permitted connectability in the process sequence with other function blocks. Thus—presented schematically—for a block 1 it may be defined that, prior to its execution, block a and b and then block d must be executed. For example, it may be defined that before "drying" a "wash" must always have taken place. Or, before the "intensive cleaning" step it is necessary to have applied a cleaning agent. Furthermore, specified other function blocks can be stored in a white list which may be connected to the respective function block. Correspondingly, a blacklist can store specified function blocks which cannot be permissibly connected to form a washing program and therefore cannot be combined. In an exemplary embodiment of the disclosure, the connection information and therefore the permitted possibilities for combining function blocks to form a washing program are stored directly in a function block.

The operator is offered a group of function blocks. These are either available for selection directly on the installation or they can be read-in via an interface from a server or a database. In order to generate emergency washing programs at the respective installation, from this group of function blocks, only those which are also activatable in the respective installation in the case of a detected fault are offered for selection by the operator. This is generally only a limited selection from the group of function blocks. Fundamentally, only those function blocks, for which the necessary machine components are formed in a fault-free manner in the installation are activatable. Thus, e.g., the "wheel rim cleaning" function block can be activated only when both "wheel rim brushes" machine components are installed in the installation on both vehicle sides and do not report a fault. This has the advantage that the operator can select only those function blocks which he can execute in a fault-free manner on site at his installation with the respective provision. The other function blocks are not even offered to the operator. From the group of function blocks which can be activated in a fault-free manner, the operator can then select specific function blocks in order to generate an emergency washing program in the case of a fault. From his input (his selection) and the information in the selected function blocks in relation to connectability thereof, a program sequence is then computed and generated automatically to form a washing program. It is also possible that from the group of function blocks which can be activated in a fault-free manner, an emergency washing program is automatically generated, i.e., without any further user inputs. This has the advantage that at any moment, new function block can be defined and provided and connected to form an emergency washing program without the machine controller having to be changed.

In dependence upon the currently detected circumstances and requirements, which are represented in the equipment data set, the function blocks which can be activated in an executable manner in the specific fault case are specified and can be output as already explained—e.g., on a (graphic) user interface—for selection by the user. Thereupon, the user, in particular the operator or service technician, has the possibility of selecting specified function blocks which he would like to offer on the machine for use by his customers. It has proven to be advantageous that the user does not have to have specific knowledge of the technical design of the washing installation and fault-handling routines. He is automatically offered for selection only those function blocks which can be executed in the detected operating conditions (represented in the equipment data set) and in the case of the detected fault state and therefore generally only one selection.

Alternatively, the selection can be detected not by a user input but on the basis of pre-settings/factory settings or can be read-in via an interface by separate electronic modules (e.g., a server which is connected to the installation and which can access the detected error message). One advantage of the disclosure can also be seen in the fact that the user does not have to observe any chronological order when selecting his function blocks. The chronological connection to form an emergency washing program results automatically from the connection rules and is computed automatically in accordance with the disclosure. Thus, the user can select, e.g., a function block C, then A, and then B. However, the generated emergency washing program has the sequence A, B and C by virtue of the stored connection rules.

All steps of the above-described method are typically executed automatically, in particular the specifying of function blocks which can be activated in a fault-free manner and the generation of an emergency washing program take place automatically. Therefore, even in the case of a detected fault on a component, the installation can still be operated in an emergency operation, which, as a whole, increases the efficiency of the installation operation and avoids downtimes of the complete installation on account of individual component faults.

The phrase "in response to the detected fault state" is intended to mean that function blocks which can be activated in a fault-free manner are specified in dependence upon the detected fault state. Therefore, the computing of emergency operation programs is always dependent upon the respective currently detected fault state of the installation. The emergency operation programs are thus computed for a specific fault state of the entire installation. A fault state is a technical state of the installation in the case of a fault. A fault state can also be caused by the failure of one or a plurality of components. However, it can also be the case that an error message of one component does not automatically result in a fault state of the installation, for instance when a replacement component is provided for the component identified as faulty and when the replacement component is automatically connected in. In this case, the installation is not in a fault state even though an error message exists. A fault state is thus systemic and relates to the entire installation and is based upon a large number of individual error messages in dependence upon the respective configuration of the machine (represented in the equipment data set). A fault state is specific to the installation but not to a component. It represents the fault profile for the entire installation in a systemic manner and takes into consideration the configuration and equipping thereof. However, an error message is component-specific.

The ascertaining of the fault state is thus based upon the detected error message of an operating assembly (e.g., "roof brush drive motor defective") and in the simplest case can indicate a directly deducible, non-activatable functionality as a fault state (e.g., "function of the roof brush wash not activatable"). In more complex applications, the activatable or non-activatable functionality can be ascertained by accessing a rule base in which stipulations (rules) are stored as to which functionality requires which operating assemblies. For example, it is possible to stipulate at this location that for a first operating assembly in the case of a fault a second operating assembly is already fitted out in the installation as a replacement (e.g., replacement battery) which is automatically or manually connected so that the functionality can be provided in spite of the error message.

The fault state is computed from at least one detected error message which, for its part, is based upon sensor signals. The fault state is represented and stored typically in a data structure. Data which provide indications relating to non-available (i.e., non-activatable in a fault-free manner) functionality of the respective (faulty) component can be accessed from a further memory. In an exemplary embodiment of the disclosure, a two-dimensional array is used in this case as a data structure. It can be implemented in the form of a look-up table which establishes, e.g., for a group of function blocks, the components or operating assemblies required for this purpose, and defines different sequence variations in which the respective function block can be operated and which operating assemblies are required for this purpose. The entries in the table are indexed and can thus be addressed with a simple access.

The term "emergency operation" denotes an operating option of the machine or washing installation with a limited functional scope, in particular a functional scope which is based upon function blocks which can be activated in a fault-free manner and therefore does not require the component identified as faulty.

The present disclosure relates to a state during the operation of the installation and in particular a fault state including stored procedures for automatic exception handling and error handling and optionally including the introduction of automatic recovery procedures.

The disclosure has the advantage that it can be automatically switched to an emergency operation as soon as an operating assembly fails and this together with the error message has been detected via corresponding sensors. Previously, it was no longer possible to continue to operate the washing installation in the case of a fault. A service technician had to fix the fault in the machine component first. However, it is often the case that only a less important machine component fails. In this case, it proves to be particularly advantageous that the failure of the respective machine component is detected with the equipment data set. It is now also possible to select function blocks which do not require this component. Therefore, the washing installation can continue to be operated while in parallel the faulty assembly can be replaced. Therefore, the maintenance costs can be reduced.

In a further exemplary embodiment of the disclosure, the emergency operation of the washing installation using the generated emergency washing program is effected only after a verification signal has been detected (e.g., by the operator or by the installation manufacturer or via a data-processing connection). The reliability of the installation operation can thereby be increased in that a plausibility check, so to speak, is carried out. The operator of the installation or an externally involved technician can then enable or activate the generated emergency washing program. It is also possible for the generated emergency washing program to be compared with a group of reference emergency operation programs stored in a database or in that specific frequent error combinations are checked automatically.

In a further exemplary embodiment of the disclosure, the generated emergency washing program is subjected to an automatic fault check. The fault check relates in this case not to the components of the washing installation but instead to an erroneous connection for creating an emergency washing program. The fault check is effected on the basis of pre-defined rules. They are structured typically according to the if-then principle (e.g., "if emergency washing program includes a brush wash, then an error message must not be present for the brush assembly"). Therefore, a plausibility check can be carried out. If this is not successful, then an error message can be output. The error message can include an automatically generated correction suggestion and/or can include a statement of technical consequences if the washing installation is operated with a fault. If, e.g., owing to currently detected operating conditions, too high an output is set for the metering pump, the increased consumption of metered agents and increased costs associated therewith can be pointed out.

According to an exemplary embodiment of the disclosure, the computing of emergency operation programs for the washing installation includes the computing of a sequence of selected function blocks, namely function blocks which can be activated in a fault-free manner, for the emergency operation of the washing installation, wherein the sequence is effected by accessing a pre-defined rule base. The rule base defines which function block can be connected to which other function blocks to create a washing program, in which time sequence and which components are required for the respective function block.

According to a further exemplary embodiment of the disclosure, an error message is detected by reading-out of sensor data of at least one sensor. Typically, a large number of sensors of different components of the washing installation and/or also of external supply units of the washing installation (water supply, pressure lines etc.) are read out in order advantageously to detect a fault state of the entire installation which is as comprehensive as possible.

According to a further exemplary embodiment of the disclosure, in the method, after detecting an error message and ascertaining a fault state, an automatic diagnosis procedure (for fault finding) is carried out which includes working through a decision tree in order to provide a technical pre-diagnosis for the detected fault state to ensure that, e.g., the exchanging of a component or a replacement component can be proposed.

According to a further exemplary embodiment of the disclosure, the diagnosis procedure is self-learning and for each automatically ascertained replacement component proposal which is ascertained for the respective fault state, an evaluation signal is detected which represents an evaluation of the fault fixing measure by the replacement of the component and which is fed back to the diagnosis procedure. Therefore, the diagnosis procedure can be continuously improved. If, after the exchange of the faulty component, the fault state is not improved or is not improved significantly, the evaluation signal is correspondingly negative. The negative evaluation signal is then fed back to the diagnosis procedure. In the other case, if the exchange was successful and thereupon the ascertained fault state could be lifted, then the evaluation signal is correspondingly positive and is communicated back to the diagnosis procedure as a regulating signal.

According to a further exemplary embodiment of the disclosure, a group of emergency operation programs, which can be executed even in the ascertained fault state, is computed and output to a user interface so that a user (e.g., operator of the washing installation) can select a suitable one by inputting a verification signal on the user interface.

According to a further exemplary embodiment of the disclosure, all method steps are carried out locally at the washing installation. Alternatively or cumulatively, at least selected method steps can be carried out on a server (which can be operated, e.g., by the manufacturer of the installation) allocated to the washing installation.

According to a further exemplary embodiment of the disclosure, the specifying of function blocks which can be activated in a fault-free manner is more complex. In the method, provision is made that different execution variations are defined for each function block. These can be pre-defined. Therefore, it is possible to execute the respective function block in different execution variations, wherein the execution variations each require a different set of operating assemblies which can be activated in a fault-free manner. This means that, in a specific fault state, one and the same function block can certainly still be operated further in a fault-free manner even when a fault is detected on one of the operating assemblies required for this purpose, in that another execution variation is selected. This is typically effected automatically, e.g., by accessing the look-up table.

According to a second aspect, the present disclosure relates to a fault control module for controlling an emergency operation of a vehicle washing installation (also abbreviated as washing installation) in the case of a fault, comprising:

a fault interface which is designed to detect an error message of the washing installation, and a computing unit which, in response to the detected error message, determines a fault state and specify function blocks, which can be activated in a fault-free manner, with their sequence variations on the basis of a read-in equipment data set which represents the current equipping of the washing installation with machine components, in order to compute emergency operation programs and wherein the computing unit is further intended, on the basis of the computed emergency operation programs, to generate control commands in order to control the washing installation in an emergency operation state.

In an exemplary embodiment of the disclosure, the fault control module can have a user interface to ensure that the user can input, e.g., a verification signal, a confirmation signal or can make other adjustments. Via the user interface, the user can control the provided functionality of the fault control module and operate the fault control module.

Typically, the fault interface is connected to a large number of sensor units. The sensor units serve to detect operating parameters of the washing installation. They can be arranged internally in operating assemblies or components of the washing installation or externally and outside same. All sensor units in their entirety or the signals aggregated by them represent a fault state of the machine. Therefore, in contrast to the prior art not only is a singular signal of a component detected but also in accordance with the disclosure an overall state, in particular an overall fault state of the installation, is determined on the basis of the individual error messages or error signals.

According to a third aspect, the disclosure relates to a washing installation having a machine controller which is designed having a fault control module described above.

The above-described method can be implemented as a computer program. A further aspect of the disclosure relates to a computer program for carrying out all of the method steps of the method described in more detail above when the computer program is executed on a computer, an electronic device or component (typically locally at the washing installation). It is thus also possible for the computer program to be stored on a medium which can be read by the computer or the electronic device or component.

The computer-implemented method can be implemented typically also as a platform-independent web-based application. This has the advantage that no further installation requirements by the operator are necessary. The user accesses a server via a typically IP-based interface, the computer program for carrying out the method being installed on this server. Therefore, in an advantageous manner, the computing unit or its functionality (in particular: ascertaining a fault state, computing an emergency operation program, generating control commands) can be outsourced to a resource-rich server. In an advantageous manner, during the computing procedure, further input variables (in particular from other washing installations operated in parallel) can be taken into account by a corresponding memory or database access.

The object is also further achieved by a computer program product which is, or can be, loaded into a memory of a computer or of an electronic device, with a computer program to carry out the method described in more detail above, when the computer program is executed on the computer or the electronic device. The electronic device can be a controlling computer for the washing installation, which is integrated into the washing installation in a switching and control unit or is connected in as a separate module via an interface.

BRIEF DESCRIPTION OF THE DRAWINGS

The disclosure will now be described with reference to the drawings wherein.

DESCRIPTION OF EXEMPLARY EMBODIMENTS

The disclosure will be explained hereinafter with the aid of exemplified embodiments and with reference to the figures.

The disclosure is directed at flexibly generating emergency washing programs when an operating assembly of a vehicle washing installation WA fails.

Figure 1:
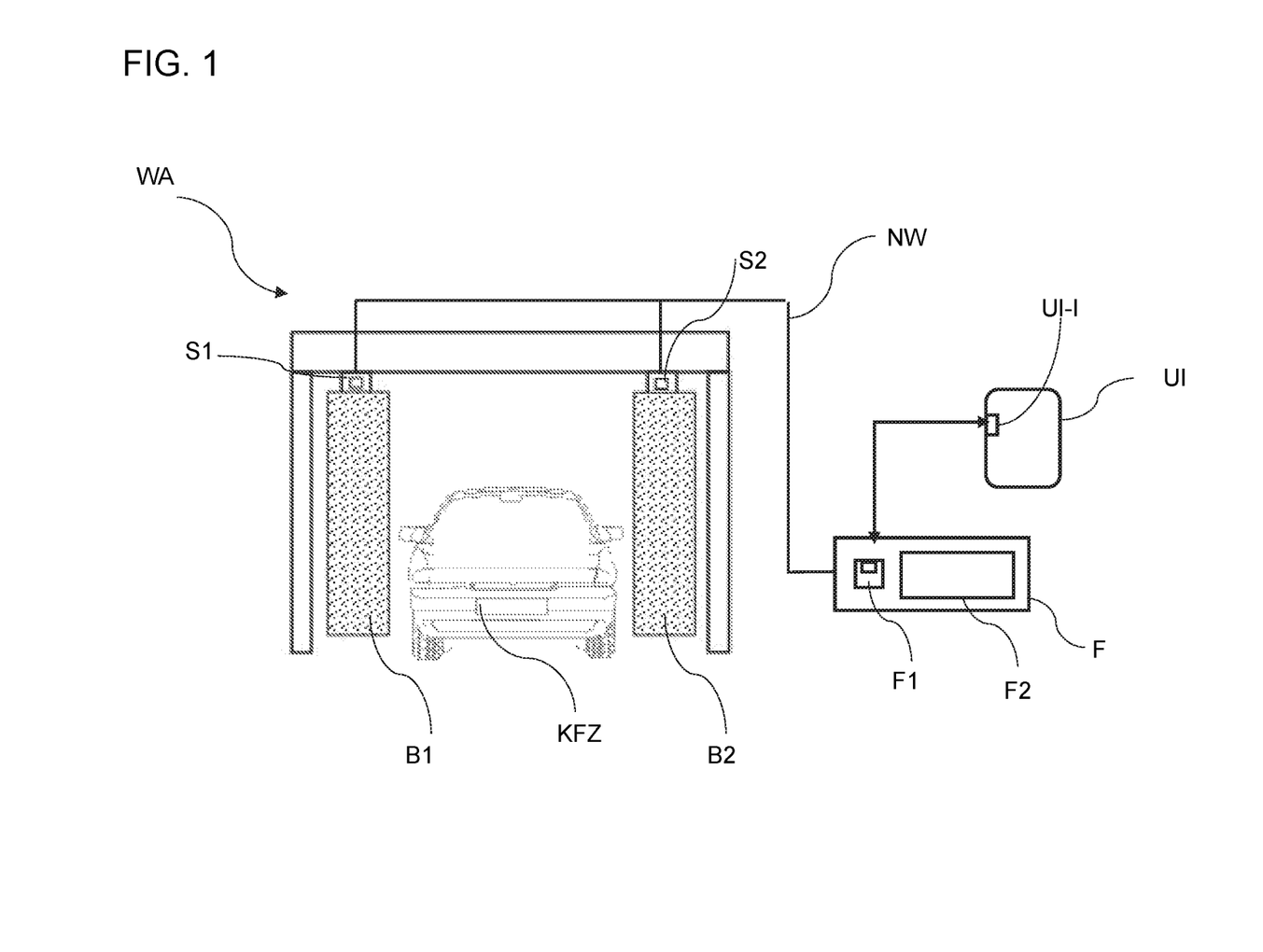
FIG. 1 shows a schematic view of a washing installation including a fault control module according to an exemplary embodiment of the disclosure.

FIG. 1 schematically shows an automatic washing installation WA which is fully assembled at an operator's location and in which a fault on an operating assembly has been detected. In order to avoid a failure of the complete installation by reason of the operating assembly fault, an electronic unit, namely a fault control module F, is provided in accordance with the disclosure.

When a fault is detected, the fault control module F serves to locally generate emergency washing programs so to speak at the operator's location. The fault control module F can be integrated into a switching and control center of the washing installation WA (schematically illustrated in FIG. 1) or can be connected in as a separate local computer via an internal interface of the washing installation WA.

The fault control module F includes a computing unit F2. The computing unit F2 serves to generate emergency washing programs which, in spite of the detected fault on a component of the washing installation WA, can be executed in a fault-free manner and are to be offered. The emergency washing program is therefore generated in a rule-based manner. The rules relate to the equipment data set which specifies the machine components with which the washing installation WA is fitted out, and to the detected error message and the ascertained fault state and possibly to inputs of a user who set the scope of performance of the installation in the case of a fault. an emergency washing program is automatically generated by a program logic based on these guide variables.

As schematically illustrated in FIG. 1, the washing installation WA can be a gantry washing installation including two side brushes which are each designated by the reference signs B1 and B2 in FIG. 1. Typically, the washing installation also includes further operating assemblies, e.g., a roof brush (not illustrated in FIG. 1), various valves, pumps, storage containers for active cleaning substances etc. All or selected operating assemblies of the washing installation WA are designed having sensor units S which—as illustrated in FIG. 1 by way of example for the two brushes B1 and B2—can include the sensors S1 and S2. The sensor units S serve to detect parameters which represent an operating state of the assembly. The detected sensor signals can be used to deduce the faultlessness or the faultiness of an operating assembly. If, e.g., the right-side brush B2 is defective or cannot be operated in a fault-free manner, the sensor S2 provides an error signal. The sensor units S are connected in terms of data processing to the fault control module F via a network NW and can exchange data at least unidirectionally. In order to exchange data, the fault control module F includes a fault interface F1. This serves in particular to detect sensor signals of the sensor units S. The sensor units S can either specify directly at least one error message or at least one error message can be computed from the detected and aggregated signals of the sensor units S1, S2, S3, . . . .

In an exemplary embodiment of the disclosure, the fault control module F can include an—in particular graphical—user interface UI, via which the user can input and read out data and via which the fault control module F can be controlled. This can also be the surface of a mobile terminal, such as a tablet or smartphone. If the user surface is provided as a separate component, it is coupled to the fault control module F via an interface UI-I which in particular is wireless (WLAN or radio link).

Figure 2:
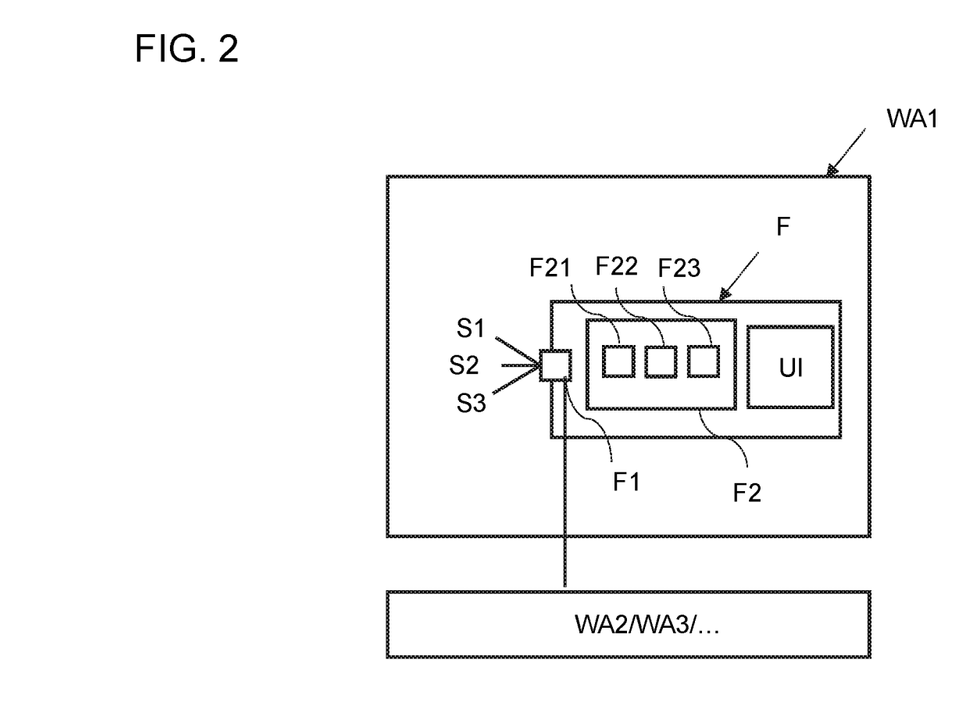
FIG. 2 shows a schematic overview of a fault control module including further components according to an exemplary embodiment of the disclosure.

As illustrated in FIG. 2, the computing unit F2 of the fault control module F can include a plurality of units:

a state-ascertaining unit F21 which is intended, in response to the detected error message, to ascertain a fault state of the vehicle washing installation WA, a function block-specifying unit F22 which, on the basis of a read-in equipment data set representing the current equipping of the vehicle washing installation WA with machine components, is configured to specify function blocks, which can be activated in a fault-free manner, for the ascertained fault state, and a computing unit F23 which is configured to compute at least one emergency operation program.

The computing unit F2 is configured, on the basis of the computed at least one emergency operation program, to generate control commands in order to control the vehicle washing installation WA in an emergency operation state or to operate said washing installation in an emergency state.

As schematically illustrated in FIG. 2, the fault control module F can also detect reference data of other washing installations WA2, WA3, . . . . This can be effected, e.g., via the fault interface F1. In other words, reference data of other installations can be detected and processed in order to be able to provide information for the respective fault case at the installation WA1 as to how this was able to be dealt with and/or overcome at other installations. It is also possible to detect which emergency operation programs have been computed for the respective fault case at the reference installation. They can be offered to the user for the purposes of comparison and/or selection. In addition, it is possible to comment on the emergency operation programs which are calculated by the computing unit F23 in terms of whether they have already also been ascertained as an emergency operation program at other installations in comparable cases. For the purpose of data security, identifying references (e.g., to the operator) can be deleted.

Figure 3:
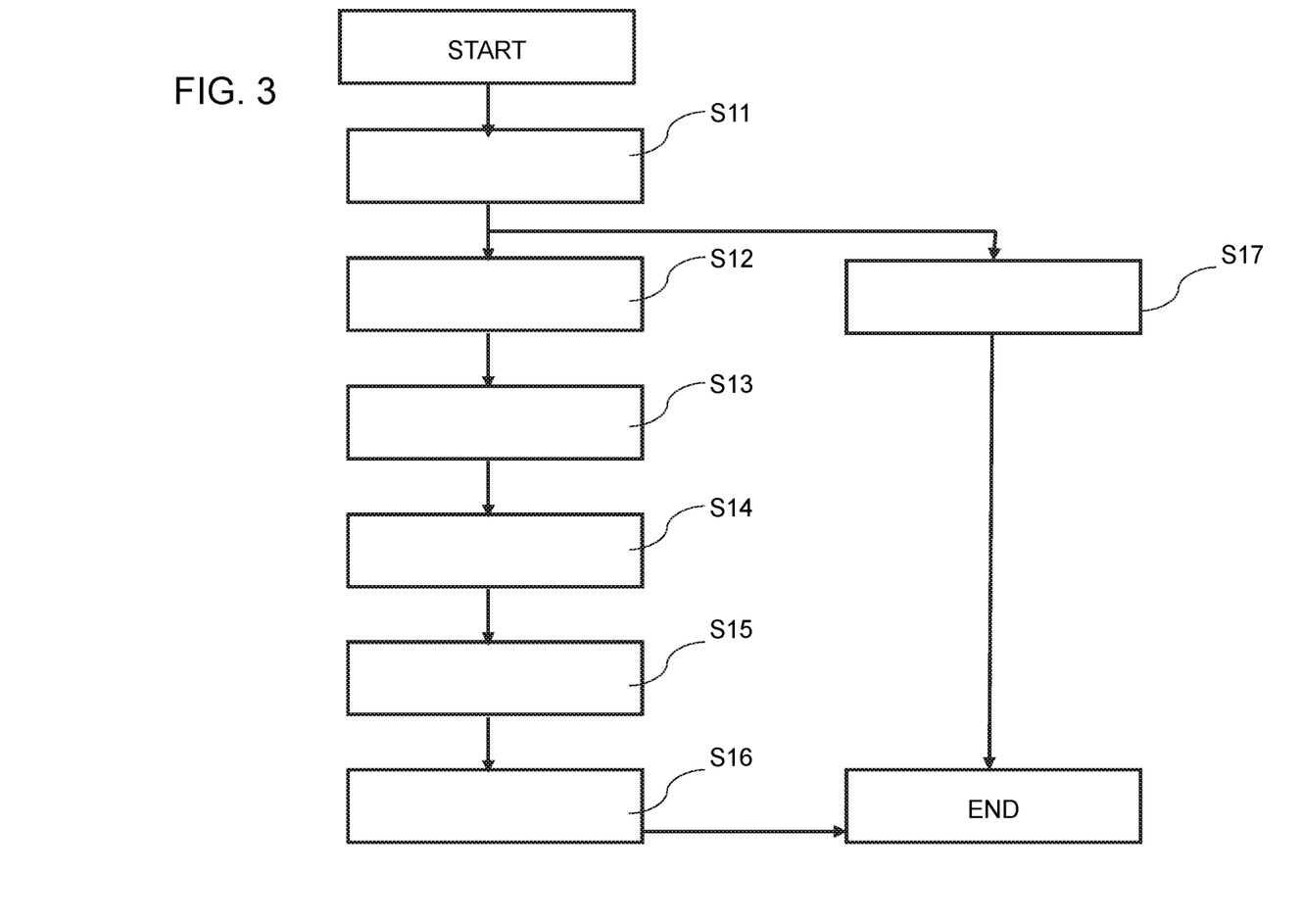
FIG. 3 shows a flow diagram of a method according to an exemplary embodiment of the disclosure.

FIG. 3 shows a flow diagram of a method. After the start of the method, at least one error message is detected in step S11.

In step S12, a fault state of the vehicle washing installation WA can be determined from the at least one detected error message. For this purpose, it is possible to access an internal memory of the washing installation WA, in which a fault code is allocated to each sensor signal. The detected sensor signals are component-specific. That is to say, a sensor signal always comprises an identification element which specifies the respective component or operating assembly of the washing installation WA, on which the sensor signal has been detected (e.g., from the signal S1 it is possible to read out that it has been detected on the brush B1 and therefore this brush is faulty). This allocation is stored in the memory. Moreover, this memory or another memory stores which function block requires which operating assemblies. In this case, e.g., it is possible to specify that a brush wash always requires the operating assemblies B1 and B2 in order to be able to be carried out in a fault-free manner.

In step S13, an equipment data set which represents the current equipping and thus also the configuration of the vehicle washing installation with machine components or operating assemblies is read in. This can be carried out after steps S11 and S12. Alternatively, the method step S13 for reading-in the equipment data set can also be carried out before step S11 or in parallel therewith.

In step S14, in response to (i.e., in dependence upon) the detected fault state of the entire washing installation WA, a group of function blocks, which can be activated in a fault-free manner, are specified on the basis of the equipment data set read-in in step S13.

A group of emergency operation programs is specified in S15. This is effected on the basis of the group of function blocks, which can be activated in a fault-free manner, which is specified in S14.

In step S16, the vehicle washing installation is activated for carrying out the emergency operation. This is effected on the basis of the computed group of emergency operation programs. The method can terminate thereafter.

Alternatively, after step S11 the method can branch off to step S17. In step S17, an automatic diagnosis procedure for the detected fault can be carried out quasi in parallel with the generation of an emergency washing program. This is based upon a decision tree which is stored in a memory and is automatically worked through depending upon detected sensor signals and other signal returns. The leaves of the decision tree represent data sets in order to be able to provide a technical pre-diagnosis for the detected fault. For example, a replacement component can thus be proposed automatically.

In order to improve the self-diagnosis procedure, for each automatically created pre-diagnosis (optionally with the proposal of a replacement part) the user detects feedback denoting the grade or quality of the pre-diagnosis in retrospect. This feedback can be input on a user interface UI and is fed to the self-diagnosis procedure. Therefore, they can be self-learning.

The method steps of the method are typically carried out in the stated order. However, this does not have to take place in immediate succession. Thus, it is possible, e.g., for the generation of the emergency washing program to be carried out only after a certain time period has elapsed or after further sensor signals have been detected.

All the method steps of the method can be implemented by electronic devices (circuits, e.g., on a printed circuit board, PCB) which are suitable for carrying out the respective method step. Conversely, all functions which are carried out by features relating to objects can be a method step of a method. Thus, e.g., the method step of "reading-in an equipment data set" can be implemented by an input interface which has said corresponding functionality for reading-in purposes.

Finally, it is noted that the description of the disclosure and the exemplary embodiments are fundamentally to be understood to be non-limiting with respect to a specific physical implementation of the disclosure. All features explained and illustrated in conjunction with individual embodiments of the disclosure can be provided in a different combination in the subject matter in accordance with the disclosure in order to achieve the advantageous effects thereof at the same time. For instance, the disclosure can be applied to different types of automatic washing installations, such as gantry washing installations or self-service washing installations. Furthermore, it is, e.g., likewise within the scope of the disclosure to provide other operating or control elements as an interface for data input or output alternatively or cumulatively with respect to the graphical user interface. It is particularly obvious to a person skilled in the art that the disclosure can be applied not only for specific configurations of washing installations but also for washing installations which are fitted out with different machine components or with machine components which are configured differently (e.g., different performance spectrum of a pump, etc.).

Furthermore, the components of the fault control module F and/or the washing installation WA can be embodied in a distributed manner on the same electronic unit or on a plurality of physical products. They are then in data exchange via corresponding interfaces. This increases the modularity of the system.

It is understood that the foregoing description is that of the exemplary embodiments of the disclosure and that various changes and modifications may be made thereto without departing from the spirit and scope of the disclosure as defined in the appended claims.

What is claimed is:

1. A computer-implemented method for controlling an emergency operation of a vehicle washing installation in the case of a fault, the method comprising:
   detecting an error message of a machine component, wherein the error message is component-specific;
   after detecting the error message, aggregating all or selected further error messages in order to automatically ascertain a fault state in relation to the vehicle washing installation, wherein the fault state depends upon the configuration of the vehicle washing installation represented in an equipment data set;
   in response to the ascertained fault state, specifying function blocks, which can be activated in a fault-free manner, based on a read-in equipment data set which represents current equipping of the vehicle washing installation with machine components for computing emergency washing programs, wherein each function block is a modular component of a washing program, wherein the each function block includes information relating to permitted connectability in a process sequence with other function blocks, wherein the computing of the emergency washing programs for the vehicle washing installation comprises computing of a sequence of selected function blocks, which can be activated in a fault-free manner, for the emergency operation of the vehicle washing installation, and wherein the sequence is effected with accessing of a pre-defined rule base; and
   controlling the vehicle washing installation for carrying out the emergency operation based on the computed emergency washing programs.

2. The computer-implemented method as claimed in claim 1, wherein the detecting of the error message is effected by reading out sensor data of at least one sensor unit of the vehicle washing installation.

3. The computer-implemented method as claimed in claim 1, wherein, after the detecting of the error message, carrying out an automatic diagnosis procedure including processing of a decision tree in order to provide a technical pre-diagnosis for the detected fault state, which the technical pre-diagnosis proposes a replacement component.

4. The computer-implemented method as claimed in claim 3, wherein the automatic diagnosis procedure is self-learning and for the replacement component proposal in response to the error message an evaluation signal is detected which represents an evaluation of a fault fixing measure by the replacement of the component and which is fed back to the automatic diagnosis procedure.

5. The computer-implemented method as claimed in claim 1, wherein a group of emergency washing programs which can be executed in the detected fault state are computed, from which, a user can select a suitable emergency washing program, in that the user inputs a verification signal on a user interface.

6. The computer-implemented method as claimed in claim 1, further comprising:
   carrying out all of the method steps locally at the vehicle washing installation.

7. The computer-implemented method as claimed in claim 1, wherein the specifying of function blocks which can be activated in the fault-free manner comprises specifying sequence variations, which can be executed in the fault-free manner, for the function blocks which can be activated in the fault-free manner.

8. A computer program with program sections for carrying out the method as claimed in claim 1 when the computer program is executed on a computer or an electronic device.

9. The computer-implemented method as claimed in claim 1, wherein the function blocks define actions of the vehicle washing installation on a superordinate functional level which is different from a machine component functional level.

10. A fault control device for controlling an emergency operation of a vehicle washing installation in the case of a fault, the fault control device comprising:
    a fault interface configured to detect an error message in relation to the vehicle washing installation, wherein the error message is component-specific; and
    a controller configured to:
    in response to the detected error message, aggregate all or selected further error messages to automatically ascertain a fault state in relation to the vehicle washing installation, wherein the fault state depends upon the configuration of the vehicle washing installation represented in an equipment data set,
    specify function blocks, which can be activated in a fault-free manner, for the ascertained fault state based on a read-in equipment data set representing current equipping of the vehicle washing installation with machine components, wherein each function block is a modular component of a washing program, wherein the each function block includes information relating to permitted connectability in a process sequence with other function blocks,
    compute emergency washing programs, wherein the computing of the emergency washing programs for the vehicle washing installation comprises computing of a sequence of selected function blocks, which can be activated in a fault-free manner, for the emergency operation of the vehicle washing installation, and wherein the sequence is effected with accessing of a pre-defined rule base, and based on the computed emergency washing programs, generate control commands to control the vehicle washing installation in an emergency operation state.

11. The fault control module as claimed in claim 10, further comprising a user interface.

12. The fault control module as claimed in claim 10, wherein the communication interface is connected to a plurality of sensor units.

13. The fault control module as claimed in claim 10, wherein the function blocks define actions of the vehicle washing installation on a superordinate functional level which is different from a machine component functional level.

14. A vehicle washing installation comprising a machine controller comprising a fault control device as claimed in claim 10.

* * * * *